US012599815B2

(12) United States Patent
 Lin et al.

(10) Patent No.: US 12,599,815 B2
(45) Date of Patent: Apr. 14, 2026

(54) TPU BALL STRUCTURE AND MANUFACTURING METHOD THEREOF

(71) Applicant: San Fang Chemical Industry Co., Ltd., Kaohsiung City (TW)

(72) Inventors: Chih-Yi Lin, Kaohsiung City (TW); Kuo-Kuang Cheng, Kaohsiung City (TW); Chi-Chin Chiang, Kaohsiung City (TW); Wen-Hsin Tai, Kaohsiung City (TW)

(73) Assignee: San Fang Chemical Industry Co., Ltd., Kaohsiung City (TW)

( * ) Notice: Subject to any disclaimer, the term of this patent is extended or adjusted under 35 U.S.C. 154(b) by 44 days.

(21) Appl. No.: 18/612,070

(22) Filed: Mar. 21, 2024

(65) Prior Publication Data

US 2024/0226667 A1  Jul. 11, 2024

Related U.S. Application Data

(62) Division of application No. 17/238,171, filed on Apr. 22, 2021, now Pat. No. 11,975,243.

(30) Foreign Application Priority Data

Apr. 24, 2020  (TW) ................................. 109113731

(51) Int. Cl.
*A63B 41/02* (2006.01)
*A63B 41/08* (2006.01)
(Continued)

(52) U.S. Cl.
CPC .............. *A63B 41/08* (2013.01); *A63B 41/02* (2013.01); *B29C 48/08* (2019.02); *B29C 48/365* (2019.02);
(Continued)

(58) Field of Classification Search
CPC ......... A63B 41/02; A63B 41/08; A63B 41/10; A63B 45/00; A63B 2209/00;
(Continued)

(56) References Cited

U.S. PATENT DOCUMENTS 6,013,340 A * 1/2000 Bonk ..................... B29C 48/10
                                                     428/424.4
7,699,726 B2   4/2010 Avis
(Continued)

FOREIGN PATENT DOCUMENTS

CN      208160960 U   11/2018
EP       1622689 A1    2/2006
EP       3175978 A1    6/2017

OTHER PUBLICATIONS

Communication of Intention to Grant from the European Patent Office on Oct. 11, 2024 for the corresponding EP patent application No. 21169801.4.
(Continued)

*Primary Examiner* — Michael A Tolin
(74) *Attorney, Agent, or Firm* — WPAT, PC

(57) ABSTRACT

The present disclosure is relates to a TPU ball structure and a manufacturing method thereof. The TPU ball structure includes a ball bladder layer, a yarn layer and a surface layer. The ball bladder layer is made of TPU material. The yarn layer is made of TPU material, and the yarn layer is disposed to cover the ball bladder layer. The surface layer is made of TPU material, and the surface layer is disposed to cover the yarn layer. The above layers of the TPU ball structure are made of TPU material to satisfy a requirement for environmental protection, and are recyclable. There is no need to use adhesive to adhere the above layers of the TPU ball structure. Therefore, the peeling strength between the layers
(Continued)

making a ball bladder layer by using a TPU material — S41 covering the ball bladder layer by a TPU yarn to form a yarn layer — S42 making a surface layer by using a TPU material — S43 covering the yarn layer by the surface layer and hot-working treatment — S44 of the TPU ball structure can be increased so that the whole peeling strength of the TPU ball structure can be increased.

9 Claims, 5 Drawing Sheets

(51) Int. Cl.

| | | |
|---|---|---|
| *B29C 48/08* | (2019.01) |
| *B29C 48/365* | (2019.01) |
| *B29C 48/88* | (2019.01) |
| *B29C 53/56* | (2006.01) |
| *B29C 65/02* | (2006.01) |
| *B29D 22/04* | (2006.01) |
| *B29K 75/00* | (2006.01) |
| *B32B 1/00* | (2024.01) |
| *B32B 5/02* | (2006.01) |
| *B32B 5/18* | (2006.01) |
| *B32B 25/10* | (2006.01) |
| *B32B 25/12* | (2006.01) |
| *B32B 27/12* | (2006.01) |
| *B32B 27/40* | (2006.01) |
| *D01D 5/16* | (2006.01) |
| *D01F 6/70* | (2006.01) |

(52) U.S. Cl.
CPC .......... *B29C 48/914* (2019.02); *B29C 53/564* (2013.01); *B29C 65/02* (2013.01); *B29D 22/04* (2013.01); *B32B 1/00* (2013.01); *B32B 5/02* (2013.01); *B32B 5/18* (2013.01); *B32B 25/10* (2013.01); *B32B 25/12* (2013.01); *B32B 27/12* (2013.01); *B32B 27/40* (2013.01); *D01D 5/16* (2013.01); *D01F 6/70* (2013.01); *A63B 2209/00* (2013.01); *B29K 2075/00* (2013.01); *B32B 2250/03* (2013.01)

(58) Field of Classification Search
CPC .......... A63B 2209/02; A63B 2209/023; A63B 2243/0025; A63B 2243/0037; A63B 2243/0066; A63B 2243/007; A63B 2243/0095; B29C 48/0012; B29C 48/07; B29C 48/08; B29C 48/365; B29C 48/37; B29C 48/911; B29C 48/9135; B29C 48/914; B29C 53/56; B29C 53/564; B29C 53/566; B29C 53/58; B29C 53/583; B29C 53/584; B29C 53/585; B29C 53/60; B29C 53/602; B29C 53/605; B29C 53/8008; B29C 53/821; B29C 53/822; B29C 59/00; B29C 59/02; B29C 59/021; B29C 59/026; B29C 65/02; B29C 65/10; B29C 65/14; B29C 65/18; B29D 22/02; B29D 22/04; B29K 2075/00; B32B 1/00; B32B 5/02; B32B 5/18; B32B 5/20; B32B 25/02; B32B 25/042; B32B 25/045; B32B 25/08; B32B 25/10; B32B 27/065; B32B 27/12; B32B 27/40; B32B 2262/0215; B32B 2262/0292; B32B 2274/00; B32B 2307/51; B32B 2307/732; B32B 2307/737; B32B 2307/7375; B32B 2307/7376; D01D 5/08; D01D 5/088; D01D 5/098; D01D 5/12; D01D 5/16; D01F 6/70
See application file for complete search history.

(56) References Cited

U.S. PATENT DOCUMENTS

| | | | | |
|---|---|---|---|---|
| 2006/0293132 A1* | 12/2006 | Laliberty | ............... | A63B 41/00 |
| | | | | 473/603 |
| 2009/0299002 A1* | 12/2009 | Peerlings | ........... | C08G 18/0895 |
| | | | | 524/590 |
| 2009/0311529 A1* | 12/2009 | Zhang | ..................... | D01D 5/16 |
| | | | | 428/401 |
| 2016/0273159 A1* | 9/2016 | Feng | ..................... | B29C 48/37 |
| 2017/0151470 A1* | 6/2017 | Nürnberg | ................. | B32B 1/00 |

OTHER PUBLICATIONS

European Patent Office "European Search Report" issued on Oct. 14, 2024, EPO.

* cited by examiner making a ball bladder layer by using a TPU material —— S41 covering the ball bladder layer by a TPU yarn to form a yarn layer —— S42 making a surface layer by using a TPU material —— S43 covering the yarn layer by the surface layer and hot-working treatment —— S44

TPU BALL STRUCTURE AND MANUFACTURING METHOD THEREOF

FIELD

The disclosure relates to a TPU ball structure and a manufacturing method thereof.

BACKGROUND

A conventional football structure is formed of a rubber bladder, a nylon long fiber, ethylene-vinyl acetate copolymer (EVA) foam and other materials. However, a conventional football manufacturing process requires a solvent, which will harm the environment and does not satisfy the requirement for environmental protection. In addition, in the conventional football manufacturing process, an adhesive is used to bond the layers. Since the materials of the layers are different, the peeling strength between the layers is not good, so that the overall peeling strength of the conventional football structure is insufficient.

SUMMARY OF THE INVENTION

In accordance with one aspect of the present disclosure, a TPU ball structure includes: a ball bladder layer, a yarn layer and a surface layer. The ball bladder layer is made of a thermoplastic polyurethane (TPU) material. The yarn layer is made of a TPU material, and the yarn layer is disposed to cover the ball bladder layer. The surface layer is made of a TPU material, and the surface layer is disposed to cover the yarn layer.

In accordance with another aspect of the present disclosure, a manufacturing method of a TPU ball structure includes: making a ball bladder layer by using a TPU material; covering the ball bladder layer by a TPU yarn to form a yarn layer; making a surface layer by using a TPU material; and covering the yarn layer by the surface layer and hot-working treatment.

BRIEF DESCRIPTION OF THE DRAWINGS

Aspects of the present disclosure are understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1:
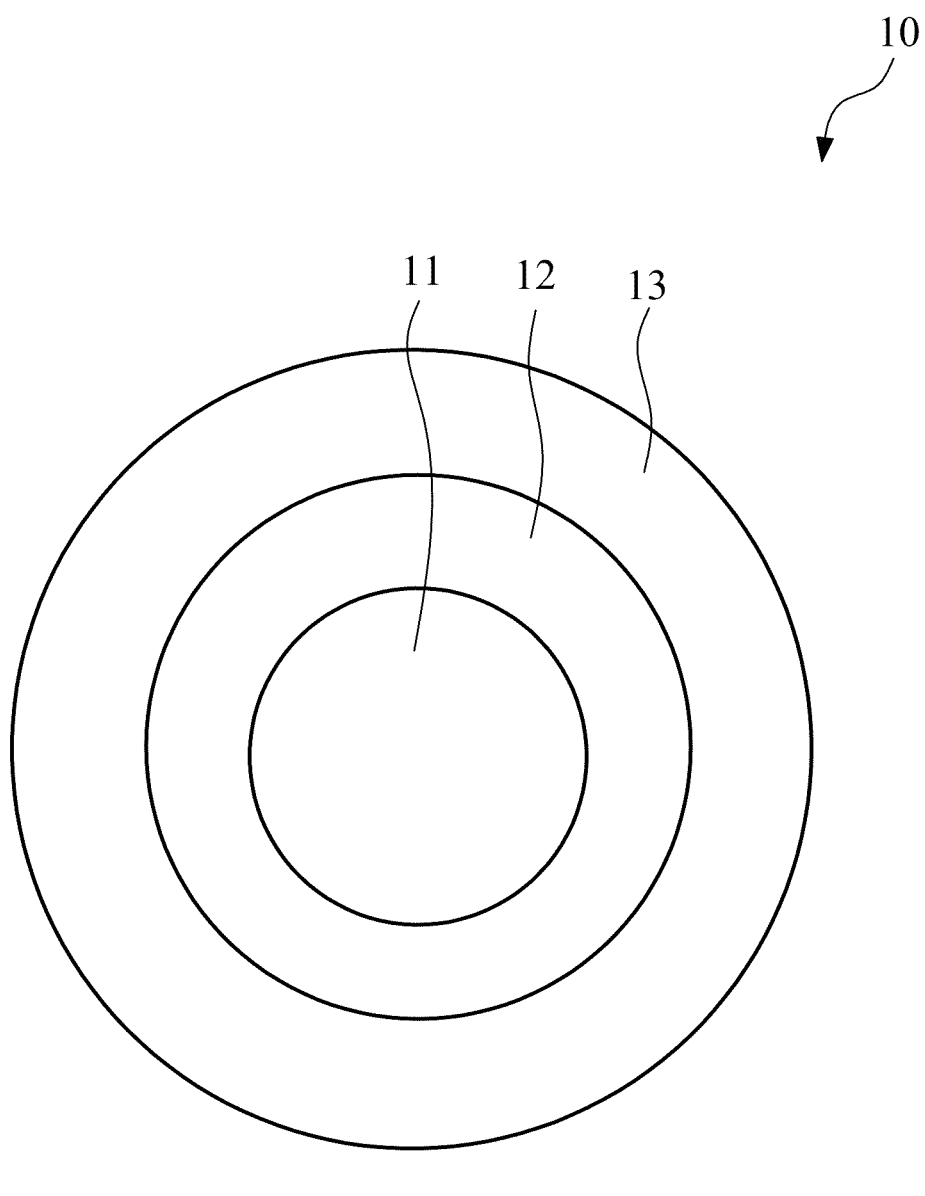
FIG. 1 is a schematic structural diagram showing a TPU ball structure according to an embodiment of the present invention.

It is to be understood that the following disclosure provides many different embodiments or examples, for implementing different features of various embodiments. Specific examples of components and arrangements are described below to simplify the present disclosure. The present disclosure may, however, be embodied in many different forms and should not be construed as being limited to the embodiments set forth herein; rather, these embodiments are provided so that this description will be thorough and complete, and will fully convey the present disclosure to those of ordinary skill in the art. It will be apparent, however, that one or more embodiments may be practiced without these specific details.

In addition, the present disclosure may repeat reference numerals and/or letters in the various examples. This repetition is for the purpose of simplicity and clarity and does not in itself dictate a relationship between the various embodiments and/or configurations discussed.

It will be understood that when an element is referred to as being "on" another element, it can be directly on the other element or intervening elements may be present. In contrast, when an element is referred to as being "directly on" another element, there are no intervening elements present.

It will be understood that singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms; such as those defined in commonly used dictionaries, should be interpreted as having a meaning that is consistent with their meaning in the context of the relevant art and the present disclosure, and will not be interpreted in an idealized or overly formal sense unless expressly so defined herein.

Referring to FIG. 1, it is a schematic structural diagram showing a TPU ball structure according to an embodiment of the present invention. In an embodiment, the TPU ball structure 10 of the present invention includes: a ball bladder layer 11, a yarn layer 12 and a surface layer 13. The ball bladder layer 11 is made of a thermoplastic polyurethane (TPU) material. The yarn layer 12 is made of a TPU material, and the yarn layer 12 is disposed to cover the ball bladder layer 11. The surface layer 13 is made of a TPU material, and the surface layer 13 is disposed to cover the yarn layer 12. The TPU ball structure 10 of the present invention can be applied to various types of balls, such as footballs, but not limited to the above.

Figure 2:
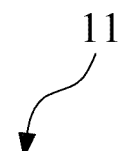
FIG. 2 is a schematic structural diagram showing a ball bladder layer according to an embodiment of the present invention.
Figure 2:
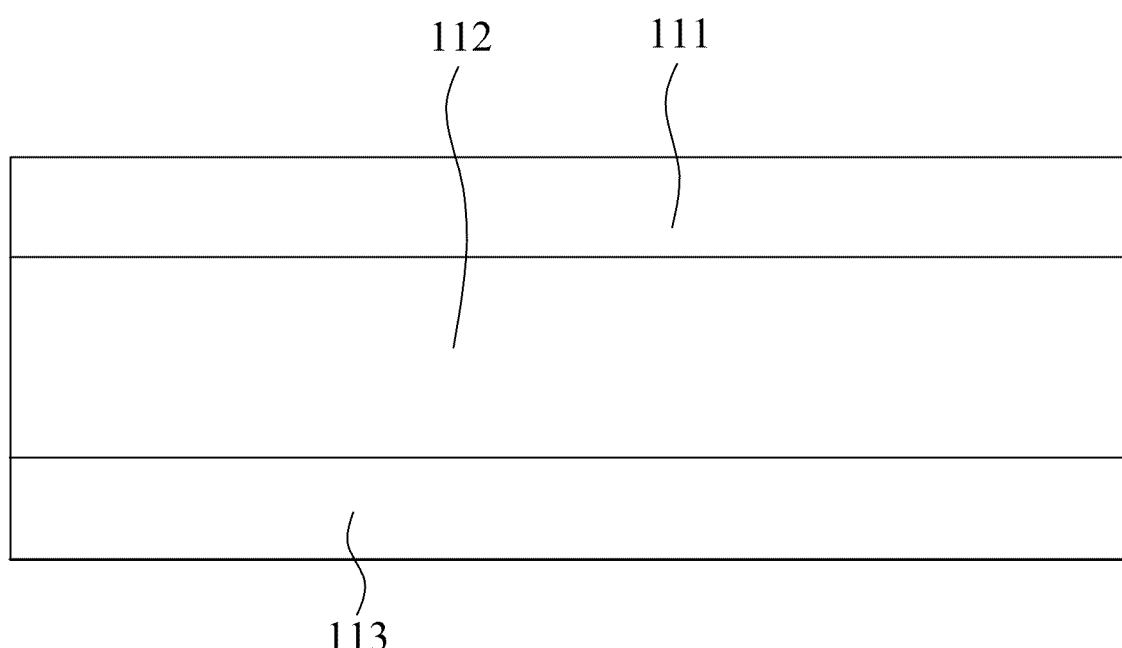

In an embodiment, the ball bladder layer 11 is made by winding a TPU long fiber by a ball bladder process. Referring to FIG. 2, it is a schematic structural diagram showing a ball bladder layer according to an embodiment of the present invention. In an embodiment, the ball bladder layer 11 includes a first high-resilience TPU layer 111, a high-airtightness TPU layer 112 and a second high-resilience TPU layer 113. The high-airtightness TPU layer 112 is disposed on the second high-resilience TPU layer 113, and the first high-resilience TPU layer 111 is disposed on the high-airtightness TPU layer 112. The thickness composite ratio of the first high-resilience TPU layer 111 to the high-airtightness TPU layer 112 to the second high-resilience TPU layer 113 is 1:2:1. In an embodiment, the thickness of the first high-resilience TPU layer may be 0.05 mm, the thickness of the high-airtightness TPU layer may be 0.1 mm, and the thickness of the second high-resilience TPU layer may be 0.05 mm.

In an embodiment, the yarn layer 12 is made of TPU winding yarn or TPU hot melt yarn. The TPU winding yarn or the TPU hot melt yarn may be a TPU elastomer. The yarn layer 12 may be subjected to hot-working treatment to bond the ball bladder layer 11 and the surface layer 12 by melting.

Figure 3:
FIG. 3 is a schematic structural diagram showing a surface layer according to an embodiment of the present invention.
Figure 3:
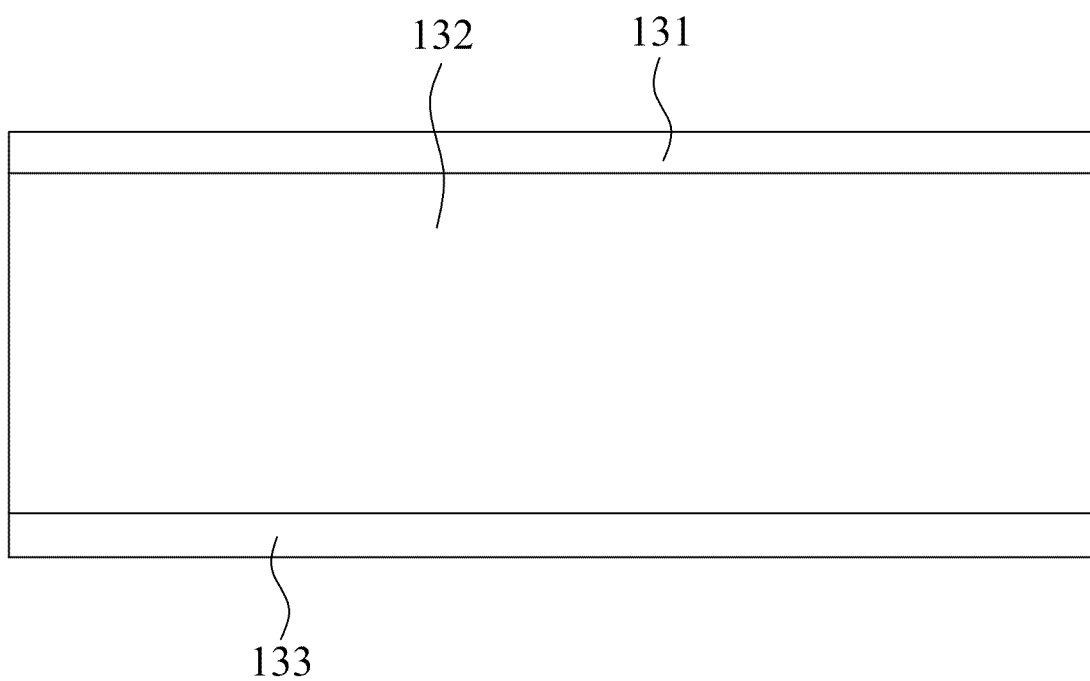

Referring to FIG. 3, it is a schematic structural diagram showing a surface layer according to an embodiment of the present invention. In an embodiment, the surface layer 13 includes an outer surface layer 131 and a latex layer. The latex layer includes a foamed latex layer 132 and an unfoamed latex layer 133. The foamed latex layer 132 is disposed on the unfoamed latex layer 133, and the outer surface layer 131 is disposed on the foamed latex layer 132. The thickness composite ratio of the outer surface layer 131 to the foamed latex layer 132 to the unfoamed latex layer 133 is 1:8:1. In an embodiment, the thickness of the outer surface layer 131 is 0.1-0.3 mm, the thickness of the foamed latex layer 132 is 0.4-1.6 mm, and the thickness of the unfoamed latex layer 133 is 0.1-0.3 mm. In an embodiment, the thickness of the outer surface layer 131 may be 0.2 mm, the thickness of the foamed latex layer 132 may be 1.6 mm, and the thickness of the unfoamed latex layer 133 may be 0.2 mm.

The TPU ball structure 10 of the present invention is made of the TPU material only, which satisfies the requirement for environmental protection and is recyclable. There is no need to use any solvent so as to avoid harming the environment. In addition, the layers of the TPU ball structure 10 of the present invention are made of the same TPU material, and there is no need to use an adhesive to bond the layers. According to the TPU ball structure 10 of the present invention, the layers can be bonded by melting. Therefore, the peeling strength between the layers can be increased, so that the overall peeling strength of the TPU ball structure 10 of the present invention can be increased.

Figure 4:
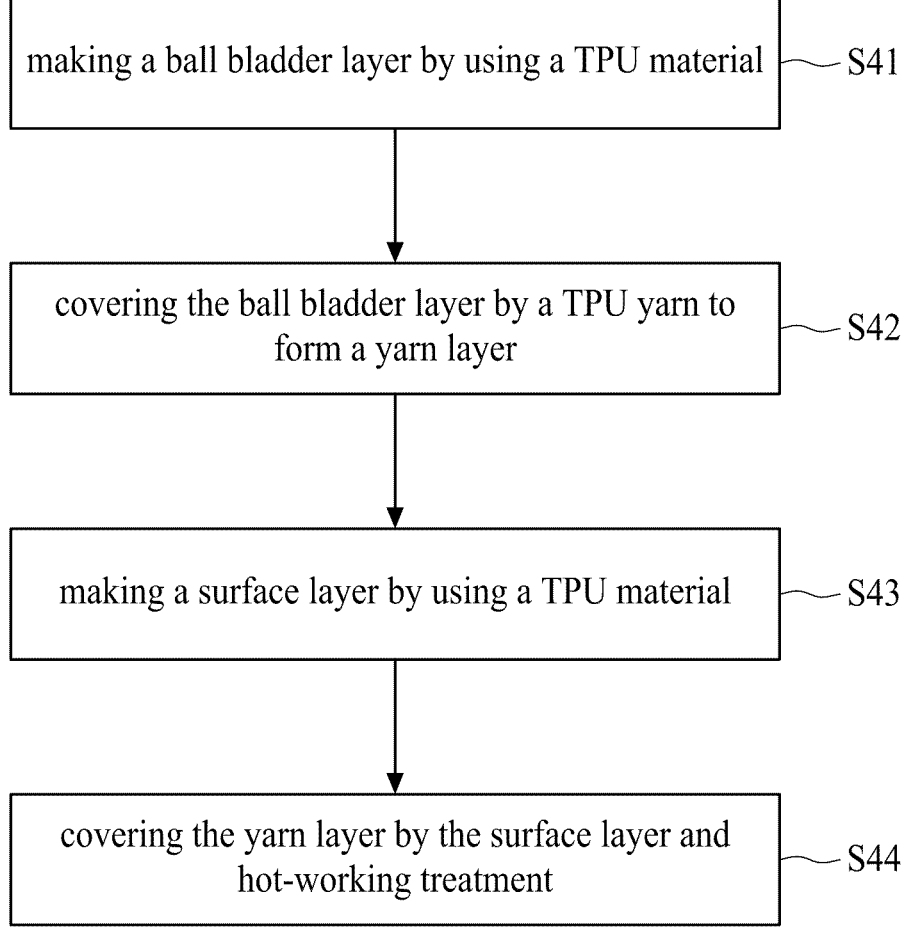
FIG. 4 is a schematic flowchart showing a manufacturing method of a TPU ball structure according to an embodiment of the present invention.

Referring to FIG. 4, it is a schematic flowchart showing a manufacturing method of a TPU ball structure according to an embodiment of the present invention. Referring to FIG. 1 and FIG. 4 together, with reference to step S41 first, the ball bladder layer 11 is made by using a TPU material. In an embodiment, the step of making the ball bladder layer includes: TPU pellets with the viscosity of 0.5-2 are prepared and dried by a drying cylinder so that the moisture content of the TPU pellets is 20-50 ppm. By using a melt-spinning process, the dried TPU pellets are transported to an extruder, melted and transported to a metering pump, and transported to a spinning assembly through the metering pump to eject a TPU filament. The TPU filament is then cooled by cooling air at the temperature of 10-50° C., drawn by drawing rollers, and wound by a winder to obtain a 200-500 den TPU long fiber. The TPU long fiber is subjected to a ball bladder process to obtain the ball bladder layer 11.

In an embodiment, the TPU long fiber has a physical property of 5-15 g/d, a 10% initial strength of 0.5-1.5 kgf and an elongation of 5-30%.

Referring to FIG. 1, FIG. 2 and FIG. 4 together, in an embodiment, the step of making the ball bladder layer 11 includes a step of making a first high-resilience TPU layer 111, a high-airtightness TPU layer 112 and a second high-resilience TPU layer 113. TPU particles are dried by a first dryer so that the moisture content is 300 ppm or below, and the TPU pellets are melted by a first extruder. The melting temperature of the first extruder is 160° C.-180° C. In an embodiment, the melting temperature of the first extruder is set to 160° C., 180° C. and 175° C. in sequence. The DIE temperature is 180° C., and the first high-resilience TPU layer 111 is made through a first metering pump.

In an embodiment, TPU particles are dried by a second dryer so that the moisture content is 300 ppm or below, and the TPU pellets are melted by a second extruder. The melting temperature of the second extruder is 160° C.-190° C. In an embodiment, the melting temperature of the second extruder is set to 160° C., 190° C. and 180° C. in sequence. The DIE temperature is 180° C., and the high-airtightness TPU layer 112 is made through a second metering pump.

In an embodiment, TPU particles are dried by a third dryer so that the moisture content is 300 ppm or below, and the TPU pellets are melted by a third extruder. The melting temperature of the third extruder is 160° C.-180° C. In an embodiment, the melting temperature of the third extruder is set to 160° C., 180° C. and 175° C. in sequence. The DIE temperature is 180° C., and the second high-resilience TPU layer 113 is made through a third metering pump.

In an embodiment, cooling is performed by using a first coating wheel to form a film, the high-airtightness TPU layer 112 is disposed on the second high-resilience TPU layer 113, and the first high-resilience TPU layer 111 is disposed on the high-airtightness TPU layer 112. The thickness composite ratio of the first high-resilience TPU layer 111 to the high-airtightness TPU layer 112 to the second high-resilience TPU layer 113 is 1:2:1. In an embodiment, the speed of the first coating wheel is 4.0 m/min, so that the ball bladder layer 11 with a total thickness of 0.2 mm is made. The thickness of the first high-resilience TPU layer 111 may be 0.05 mm, the thickness of the high-airtightness TPU layer 112 may be 0.1 mm, and the thickness of the second high-resilience TPU layer 113 may be 0.05 mm. The test data is as follows:

| Thickness | Direction | Tensile Kgf/cm$^2$ | Elongation % | Tear Kgf/cm | Weight sqm |
|---|---|---|---|---|---|
| 0.20 mm | T | 281 | 901 | 59 | 235 |
| | Y | 265 | 1047 | 52 | |

Figure 5:
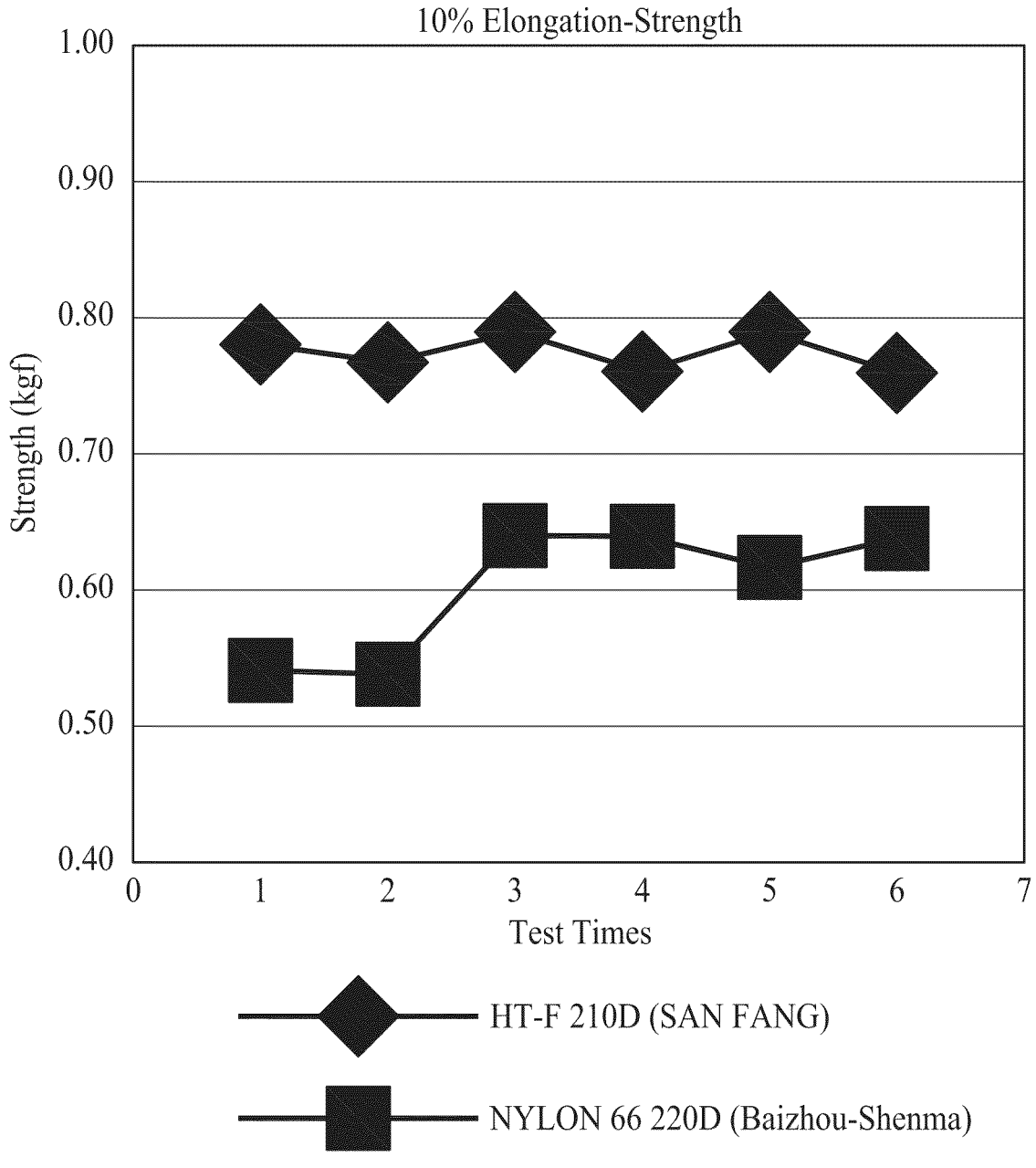
FIG. 5 is a comparison diagram of breaking strength at 10% elongation between the conventional nylon (NYLON 66 220D) yarn and the TPU yarn (HT-F 210D) of the present invention.

Referring to FIG. 1 and FIG. 4 together, with reference to step S42, TPU yarn is disposed to cover the ball bladder layer 11 to form a yarn layer 12. In an embodiment, the TPU yarn is wound to cover the ball bladder layer 11 to form the yarn layer 12. FIG. 5 is a comparison diagram of breaking strength at 10% elongation between the conventional nylon (NYLON 66 220D) yarn and the TPU yarn (HT-F 210D) of the present invention. As shown in FIG. 5, the breaking strength of the TPU yarn (HT-F 210D) of the present invention in each tensile test is higher than that of the conventional nylon (NYLON 66 220D) yarn. In addition, the breaking strength each time is average.

Referring to FIG. 1, FIG. 3 and FIG. 4, with reference to step S43, a surface layer 13 is made by using a TPU material. In an embodiment, the step of making the surface layer 13 includes a step of making an outer surface layer 131, a foamed latex layer 132 and an unfoamed latex layer 133. TPU particles with the Shore hardness of 80-90A and the melting point of 140-160° C. are dried with a fourth dryer so that the moisture content is 300 ppm or below. The TPU pellets are melted by a fourth extruder. The melting temperature of the fourth extruder is 185° C.-200° C. In an embodiment, the melting temperature of the fourth extruder is set to 185° C., 200° C. and 195° C. in sequence. The DIE temperature is 185° C., and the outer surface layer 131 is made through a fourth metering pump.

In an embodiment, TPU particles with the Shore hardness of 60-85A and the melting point of 120-140° C. are dried with a fifth dryer so that the moisture content is 300 ppm or below. The TPU pellets are melted by a fifth extruder, and 0.5-5.0% of a microsphere foaming agent is added. The melting temperature of the fifth extruder is 160° C.-190° C. In an embodiment, the melting temperature of the fifth extruder is set to 160° C., 190° C. and 185° C. in sequence. The DIE temperature is 185° C., and the foamed latex layer 132 is made through a fifth metering pump.

In an embodiment, TPU particles with the Shore hardness of 60-85A and the melting point of 90-130° C. are dried with a sixth dryer so that the moisture content is 300 ppm or below. The TPU pellets are melted by a sixth extruder. The melting temperature of the sixth extruder is 160° C.-180° C. In an embodiment, the melting temperature of the sixth extruder is set to 160° C., 180° C. and 170° C. in sequence. The DIE temperature is 185° C., and the unfoamed latex layer 133 is made through a sixth metering pump.

In an embodiment, cooling is performed by using a second coating wheel to form a film, the foamed latex layer 132 is disposed on the unfoamed latex layer 133, and the outer surface layer 131 is disposed on the foamed latex layer 132. The thickness composite ratio of the outer surface layer to the foamed latex layer to the unfoamed latex layer is 1:8:1. In an embodiment, the speed of the second coating wheel is 4.0 m/min, so that the surface layer 13 with a total thickness of 2.0 mm is made. The thickness of the outer surface layer 131 may be 0.2 mm, the thickness of the foamed latex layer 132 may be 1.6 mm, and the thickness of the unfoamed latex layer 133 may be 0.2 mm. In an embodiment, the thickness of the outer surface layer 131 is 0.1-0.3 mm, the thickness of the foamed latex layer 132 is 0.4-1.6 mm, and the thickness of the unfoamed latex layer 133 is 0.1-0.3 mm.

Referring to FIG. 1 and FIG. 4, with reference to step S44, the surface layer 13 is disposed to cover the yarn layer 12 and subjected to hot-working treatment. In an embodiment, by using the hot-working treatment, the yarn layer 12 may bond the ball bladder layer 11 and the surface layer 12 by melting.

In an embodiment, the manufacturing method of the present invention further includes a step of transferring a pattern by pressing, which uses a cold mold to transfer the pattern to the outer surface layer 131.

The manufacturing method of the TPU ball structure 10 of the present invention uses the TPU material only, which satisfies the requirement for environmental protection and is recyclable. The above manufacturing method does not need to use any solvent so as to avoid harming the environment. In addition, the layers of the TPU ball structure 10 of the present invention are made of the same TPU material, and there is no need to use an adhesive to bond the layers. According to the manufacturing method of the TPU ball structure 10 of the present invention, the layers are bonded by melting. Therefore, the peeling strength between the layers can be increased, so that the overall peeling strength of the TPU ball structure 10 of the present invention can be increased.

Moreover, the scope of the present application is not intended to be limited to the particular embodiments of the process, machine, manufacture, and composition of matter, means, methods and steps described in the specification. As those skilled in the art will readily appreciate form the present disclosure, processes, machines, manufacture, compositions of matter, means, methods, or steps, presently existing or later to be developed, that perform substantially the same function or achieve substantially the same result as the corresponding embodiments described herein may be utilized in accordance with some embodiments of the present disclosure.

Accordingly, the appended claims are intended to include within their scope such processes, machines, manufacture, and compositions of matter, means, methods or steps. In addition, each claim constitutes a separate embodiment, and the combination of various claims and embodiments are within the scope of the invention.

What is claimed is:

1. A method for manufacturing a thermoplastic polyurethane (TPU) ball structure, comprising:
   making a ball bladder layer by using a TPU material;
   covering the ball bladder layer by a TPU yarn to form a yarn layer;
   making a surface layer by using a TPU material; and
   covering the yarn layer by the surface layer and hot-working treatment;
   wherein the step of making the ball bladder layer comprises:
      preparing TPU pellets and drying the TPU pellets with a drying cylinder so that a moisture content of the TPU pellets is 20-50 ppm,
      melt-spinning a TPU long fiber by transporting the dried TPU pellets to an extruder, melting the dried TPU pellets, transporting the melted material to a metering pump and then to a spinning assembly to eject a TPU filament, cooling the TPU filament with cooling air at a temperature of 10-50° C., drawing the TPU filaments with drawing rollers, and winding the TPU filament with a winder to obtain a 200-500 denier TPU long fiber, and
      subjecting the TPU long fiber to a ball bladder process to obtain the ball bladder layer.

2. The method of claim 1 wherein the step of making the ball bladder layer further comprises:
   making a first high-resilience TPU layer, a high-airtightness TPU layer, and a second high-resilience TPU layer;
   wherein making the first high-resilience TPU layer comprises drying TPU pellets with a first dryer so that a moisture content of the TPU pellets is below 300 ppm, and melting the TPU pellets in a first extruder, wherein a melting temperature of the first extruder is 160° C.-180° C., and transporting the melted material through a first metering pump.

3. The method of claim 2, wherein the step of making the ball bladder layer further comprises:
   making the high-airtightness TPU layer by drying TPU pellets with a second dryer so that a moisture content of the TPU pellets is below 300 ppm, melting the TPU pellets in a second extruder, wherein a melting temperature of the second extruder is 160° C.-190° C., and transporting the melted material through a second metering pump.

4. The method of claim 3, wherein the step of making the ball bladder layer further comprises:
   making the second high-resilience TPU layer by drying TPU pellets with a third dryer so that a moisture content of the TPU pellets is below 300 ppm, melting the TPU pellets in a third extruder, wherein a melting temperature of the third extruder is 160° C.-180° C., and transporting the melted material through a third metering pump.

5. The method of claim 4, wherein the step of making the ball bladder layer further comprises:

disposing the second high-resilience TPU layer, the high-airtightness TPU layer, and the first high-resilience TPU layer on a coating wheel to form a film, wherein the high-airtightness TPU layer is disposed on the second high-resilience TPU layer, the first high-resilience TPU layer is disposed on the high-airtightness TPU layer; and cooling the film with the coating wheel;

wherein a thickness composite ratio of the first high-resilience TPU layer to the high-airtightness TPU layer to the second high-resilience TPU layer is 1:2:1.

6. The method of claim 1, wherein the step of making the surface layer comprises:

making an outer surface layer, a foamed latex layer, and an unfoamed latex layer;

wherein making the outer surface layer comprises drying TPU pellets with a first dryer so that a moisture content of the TPU pellets is below 300 ppm, melting the TPU pellets a first extruder, wherein a melting temperature of the first extruder is 185° C.-200° C., and transporting the melted material through a first metering pump.

7. The method of claim 6, wherein the step of making the outer surface layer further comprises:

making the foamed latex layer by drying TPU pellets with a second dryer so that a moisture content of the TPU pellets is below 300 ppm, melting the TPU pellets in a second extruder, adding 0.5-5.0% of a microsphere foaming agent, wherein a melting temperature of the second extruder is 160° C.-190° C., and transporting the melted material through a second metering pump.

8. The method of claim 7, wherein the step of making the surface layer further comprises:

making the unfoamed latex layer by drying TPU pellets with a third dryer so that a moisture content of the TPU pellets is below 300 ppm, melting the TPU pellets in a third extruder, wherein a melting temperature of the third extruder is 160° C.-180° C., and transporting the melted material through a third metering pump.

9. The method of claim 8, wherein the step of making the surface layer further comprises:

disposing the unfoamed latex layer, the foamed latex layer, and the outer surface layer on a coating wheel to form a film, wherein the foamed latex layer is disposed on the unfoamed latex layer, and the outer surface layer is disposed on the foamed latex layer; and cooling the film with the coating wheel;

wherein a thickness composite ratio of the outer surface layer to the foamed latex layer to the unfoamed latex layer is 1:8:1.

* * * * *